US011941561B2

(12) United States Patent
Grossman et al.

(10) Patent No.: US 11,941,561 B2
(45) Date of Patent: Mar. 26, 2024

(54) AUTOMATED DISTRIBUTION OF SUBTASK ASSIGNMENTS TO USER DEVICES

(71) Applicant: AUTODESK, INC., San Francisco, CA (US)

(72) Inventors: Tovi Grossman, Toronto (CA); George Fitzmaurice, Toronto (CA); Cristin Ailie Fraser, San Diego, CA (US)

(73) Assignee: AUTODESK, INC., San Francisco, CA (US)

( * ) Notice: Subject to any disclaimer, the term of this patent is extended or adjusted under 35 U.S.C. 154(b) by 533 days.

(21) Appl. No.: 15/862,484

(22) Filed: Jan. 4, 2018

(65) Prior Publication Data

US 2018/0197131 A1 Jul. 12, 2018

Related U.S. Application Data

(60) Provisional application No. 62/443,618, filed on Jan. 6, 2017.

(51) Int. Cl.
*G06Q 10/0631* (2023.01)
*G06Q 10/00* (2023.01)
(Continued)

(52) U.S. Cl.
CPC ......... *G06Q 10/06316* (2013.01); *G09B 5/06* (2013.01); *G09B 19/24* (2013.01); *H04W 4/14* (2013.01); *H04W 4/30* (2018.02)

(58) Field of Classification Search
CPC ..................................................... G06Q 10/00
See application file for complete search history.

(56) References Cited

U.S. PATENT DOCUMENTS

2009/0204470 A1\* 8/2009 Weyl ...................... G06Q 10/06
705/7.13
2009/0281865 A1\* 11/2009 Stoitsev ........... G06Q 10/06312
705/7.22

(Continued)

OTHER PUBLICATIONS

Cong, Guojing, et al. "Solving large, irregular graph problems using adaptive work-stealing." 2008 37th International Conference on Parallel Processing. IEEE, 2008. (Year: 2008).\*

(Continued)

*Primary Examiner* — Hafiz A Kassim
*Assistant Examiner* — Zahra Elkassabgi
(74) *Attorney, Agent, or Firm* — Artegis Law Group, LLP

(57) ABSTRACT

A subtask assignment system for assisting groups of workers to complete a task more efficiently. The task may comprise a physical assembly task of an object. The physical assembly task comprises a plurality of subtasks that must each be completed to complete the physical assembly task. The subtask assignment system may include an assignment server connected to a plurality of user devices via a network, each user device being operated by a particular worker. The assignment server may execute an assignment engine that receives inputs describing the overall task and group of workers, generates a task model representing the task based on the inputs, populates a parameters table based on the inputs, and automatically determines subtask assignments for the group of workers based on the task model and the parameters table. The assignment server determines an optimal subtask to assign to each worker based on the parameters.

20 Claims, 8 Drawing Sheets

(51) Int. Cl.
G09B 5/06 (2006.01)
G09B 19/24 (2006.01)
H04W 4/14 (2009.01)
H04W 4/30 (2018.01)

(56) References Cited

U.S. PATENT DOCUMENTS

2017/0061357 A1* 3/2017 Dubey .................. G06Q 40/12
2017/0064027 A1* 3/2017 Grenader ............. G06F 16/172
2018/0341891 A1* 11/2018 Setchell ................ G06Q 10/10

OTHER PUBLICATIONS

A. I. Chittilappilly, L. Chen and S. Amer-Yahia, "A Survey of General-Purpose Crowdsourcing Techniques," in IEEE Transactions on Knowledge and Data Engineering, vol. 28, No. 9, pp. 2246-2266, Sep. 1, 2016, doi: 10.1109/TKDE.2016.2555805. (Year: 2016).*
Aehnelt et al., "Follow-Me: Smartwatch Assistance on the Shop Floor", Springer International Publishing, http://doi.org/10.1007/978-3-319-07293-7_27, 2014, pp. 279-287.
Agrawala et al., "Designing Effective Step-By-Step Assembly Instructions", ACM SIGGRAPH, Papers on—SIGGRAPH '03, ACM Press, http://doi.org/10.1145/1201775.882352, 2003, pp. 828-837.
Antifakos et al., "Proactive Instructions for Furniture Assembly", In UbiComp 2002: Ubiquitous Computing, Springer-Verlag Berlin Heidelberg, http://doi.org/10.1007/3-540-45809-3_27, 2002, pp. 351-360.
Bannat et al., "Towards Optimal Worker Assistance: A Framework for Adaptive Selection and Presentation of Assembly Instructions", Proc. 1st Int, Workshop on Cognition for Technical Systems, Cotesys, Jan. 2008, 7 pages.
Birnholtz et al., "An Exploratory Study of Input Configuration and Group Process in a Negotiation Task Using a Large Display", Proceedings of the SIGCHI conference on Human factors in computing systems—CHI '07, ACM Press, 91, http://doi.org/10.1145/1240624.1240638, Apr. 28-May 3, 2007, pp. 91-100.
Campagnolo et al., "An Architecture for Supporting Small Collocated Teams in Cooperative Software Development", 13th International Conference on Computer Supported Cooperative Work in Design, IEEE, http://doi.org/10.1109/CSCWD.2009.4968069, 2009, pp. 264-269.
Carroll et al., "Notification and awareness: synchronizing task-oriented collaborative activity", International Journal of Human-Computer Studies, vol. 58, No. 5, http://doi.org/10.1016/S1071-5819(03)00024-7, 2003, pp. 605-632.
Chang et al., "Supporting Situation Awareness in Collaborative Tabletop Systems with Automation", Proceedings of the Ninth ACM International Conference on Interactive Tabletops and Surfaces—ITS '14, ACM Press, http://doi.org/10.1145/2669485.2669496, Nov. 16-19, 2014, pp. 185-194.
Cheng et al., "TurkDeck: Physical Virtual Reality Based on People", Proceedings of the 28th Annual ACM Symposium on User Interface Software & Technology—UIST '15, ACM Press, http://doi.org/10.1145/2807442.2807463, Nov. 8-11, 2015, pp. 417-426.
Clayphan et al., "ScriptStorm: scripting to enhance tabletop brainstorming", Personal and Ubiquitous Computing 18, vol. 6, http://doi.org/10.1007/s00779-013-0746-z, Feb. 15, 2013, pp. 1433-1453.
Dontcheva et al., "Combining Crowdsourcing and Learning to Improve Engagement and Performance", Proceedings of the 32nd annual ACM conference on Human factors in computing systems—CHI '14, ACM Press, http://doi.org/10.1145/2556288.2557217, Apr. 26-May 1, 2014, pp. 3379-3388.
Gerkey et al., "A Formal Analysis and Taxonomy of Task Allocation in Multi-Robot Systems", The International Journal of Robotics Research, vol. 23, No. 9, http://doi.org/10.1177/0278364904045564, Sep. 2004, pp. 939-954.
Greer et al., "Software release planning: An evolutionary and iterative approach", Information and Software Technology, vol. 46, No. 4, http://doi.org/10.1016/j.infsof.2003.07.002, Jul. 22, 2003, pp. 243-253.
Gupta et al., "DuploTrack: A Real-time System for Authoring and Guiding Duplo Block Assembly", Proceedings of the 25th annual ACM symposium on User interface software and technology—UIST '12, ACM Press, http://doi.prg/10.1145/2380116.2380167, Oct. 7-10, 2012, pp. 389-401.
Henderson et al., "Augmented Reality in the Psychomotor Phase of a Procedural Task", 10th IEEE International Symposium on Mixed and Augmented Reality, IEEE, http://doi.org/10.1109/ISMAR.2011.6092386, Oct. 26-29, 2011, pp. 191-200.
Hu et al., "Assembly system design and operations for product variety", CIRP Annals—Manufacturing Technology, vol. 60, No. 2, http://doi.org/10.1016/j.cirp.2011.05.004, 2011, pp. 715-733.
Isenberg et al., "An Exploratory Study of Co-located Collaborative Visual Analytics around a Tabletop Display", Proceedings of Visual Analytics Science and Technology (VAST), IEEE Computer Society, 10.1109/VAST.2010.5652880, 2011, pp. 179-186.
Johnson et al., "Handheld or Handsfree? Remote Collaboration via Lightweight Head-Mounted Displays and Handheld Devices", Proceedings of the 18th ACM Conference on Computer Supported Cooperative Work & Social Computing—CSCW '15, ACM Press, http://doi.org/10.1145/2675133.2675176, Mar. 14-18, 2015, pp. 1825-1836.
Kirk et al., "Turn It This Way: Grounding Collaborative Action with Remote Gestures", Proceedings of the SIGCHI conference on Human factors in computing systems—CHI '07, ACM Press, http://doi.org/10.1145/1240624.1240782, Apr. 28-May 3, 2007, pp. 1039-1048.
Knibbe et al., "Smart Makerspace: An Immersive Instructional Space for Physical Tasks", Proceedings of the 2015 International Conference on Interactive Tabletops & Surfaces—ITS '15, ACM Press, http://doi.org/10.1145/2817721.2817741, Nov. 15-18, 2015, pp. 83-92.
Kraut et al., "Collaboration in Performance of Physical Tasks: Effects on Outcomes and Communication", Proceedings of the 1996 ACM conference on Computer supported cooperative work—CSCW '96, ACM Press, http://doi.org/10.1145/240080.240190, 1996, pp. 57-66.
Lafreniere et al., "Task-Centric Interfaces for Feature-Rich Software", Proceedings of the 26th Australian Computer-Human Interaction Conference on Designing Futures the Future of Design—OzCHI '14, ACM Press, http://doi.org/10.1145/2686612.2686620, Dec. 2-5, 2014, pp. 49-58.
Lafreniere et al., "Crowdsourced Fabrication", Proceedings of the 29th Annual Symposium on User Interface Software and Technology—UIST '16, ACM Press, http://doi.org/10.1145/2984511.2984553, Oct. 16-19, 2016, pp. 15-28.
Luqman et al., "Overseer: A Mobile Context-Aware Collaboration and Task Management System for Disaster Response", Eighth International Conference on Creating, Connecting and Collaborating through Computing, IEEE, http://doi.org/10.1109/C5.2010.10, 2010, pp. 76-82.
Michalos et al., "Automotive assembly technologies review: challenges and outlook for a flexible and adaptive approach", CIRP Journal of Manufacturing Science and Technology, vol. 2, No. 2, http://doi.org/10.1016/i.cirpj.2009.12.001, 2009, pp. 81-91.
Newell et al., "Mechanisms of skill acquisition and the law of practice", In Cognitive skills and their acquisition, John Robert Anderson (ed.). Lawrence Erlbaum Associates, Inc., Hillsdale, NJ, Sep. 1980, pp. 1-55.
Pinelle et al., "Evaluating teamwork support in tabletop groupware applications using collaboration usability analysis", Personal and Ubiquitous Computing, vol. 12, No. 3, http://doi.org/10.1007/s00779-007-0145-4, 2008, pp. 237-254.
Ranjan et al., "Dynamic Shared Visual Spaces: Experimenting with Automatic Camera Control in a Remote Repair Task", Proceedings of the SIGCHI conference on Human factors in computing systems—CHI '07, ACM Press, http://doi.org/10.1145/1240624.1240802, Apr. 28-May 3, 2007, pp. 1177-1186.
Schoop et al., "Drill Sergeant: Supporting Physical Construction Projects through an Ecosystem of Augmented Tools", Proceedings of the 2016 CHI Conference Extended Abstracts on Human Factors

(56) References Cited

OTHER PUBLICATIONS in Computing Systems—CHI EA '16, ACM Press, http://doi.org/10.1145/2851581.2892429, May 7-12, 2016, pp. 1607-1614.

Shehory et al., "Methods for task allocation via agent coalition formation", Artificial Intelligence, vol. 101, No. 1, http://doi.org/10.1016/S0004-3702(98)00045-9, 1998, pp. 165-200.

Sodhi et al., "BeThere: 3D Mobile Collaboration with Spatial Input", Proceedings of the SIGCHI Conference on Human Factors in Computing Systems—CHI '13, ACM Press, http://doi.org/10.1145/2470654.2470679, Apr. 27-May 2, 2013, pp. 179-188.

Tan et al., "Using job-shop scheduling tasks for evaluating collocated collaboration", Personal and Ubiquitous Computing, vol. 12, No. 3, http://doi.org/10.1007/s00779-007-0154-3, Oct. 14, 2006, pp. 255-267.

Tang et al., "Comparative Effectiveness of Augmented Reality in Object Assembly", Proceedings of the conference on Human factors in computing systems—CHI '03, ACM Press, vol. 5, No. 1, http://doi.org/10.1145/642611.642626, Apr. 6-10, 2003, pp. 73-80.

Del Valle et al., "Automatic Assembly Task Assignment for a Multirobot Environment", Control Engineering Practice, vol. 4, No. 7, http://doi.org/10.1016/0967-0661(96)00089-5, 1996, pp. 915-921.

Waldspurger et al., "Lottery Scheduling: Flexible Proportional-Share Resource Management", Proceedings of the 1st USENIX conference on Operating Systems Design and Implementation, USENIX Association, 1, 1994, 11 pages.

Wallace et al., "Investigating the Role of a Large, Shared Display in Multi-Display Environments", Computer Supported Cooperative Work (CSCW), vol. 20, No. 6, http://doi.org/10.1007/s10606-011-9149-8, 2011, pp. 529-561.

Wallace et al., "Investigating teamwork and taskwork in single- and multi-display groupware systems", Personal and Ubiquitous Computing, vol. 13, No. 8, http://doi.org/10.1007/s00779-009-0241-8, 2009, pp. 569-581.

Westerfield et al., "Intelligent Augmented Reality Training for Assembly Tasks", Springer Berlin Heidelberg, http://doi.org/10.1007/978-3-642-39112-5_55, 2013, pp. 542-551.

Wittenbaum et al., "Coordination in Task-Performing Groups", In Theory and Research on Small Groups, R. Scott Tindale, Linda Heath, John Edwards, et al. (eds.), Kluwer Academic Publishers, Boston, http://doi.org/10.1007/0-306-47144-2_9, 2002, pp. 177-204.

Ziegler et al., "The potential of smartwatches to support mobile industrial maintenance tasks", IEEE 20th Conference on Emerging Technologies & Factory Automation (ETFA), IEEE, http://doi.org/10.1109/ETFA.2015.7301479, 2015, pp. 1-7.

Artigues, Christian, "The Resource-Constrained Project Scheduling Problem", In Resource-Constrained Project Scheduling, Christian Artigues, Sophie Demassey and Emmanuel Nron (eds.). ISTE, London, UK, http://doi.org/10.1002/9780470611227, 2008, pp. 21-36.

Funk et al., "A Benchmark for Interactive Augmented Reality Instructions for Assembly Tasks", Proceedings of the 14th International Conference on Mobile and Ubiquitous Multimedia—MUM '15, ACM Press, http://doi.org/10.1145/2836041.2836067, Nov. 30-Dec. 2, 2015, pp. 253-257.

Funk et al., "Interactive Worker Assistance:Comparing the Effects of In-Situ Projection, Head-Mounted Displays, Tablet, and Paper Instructions", Proceedings of the 2016 ACM International Joint Conference on Pervasive and Ubiquitous Computing—UbiComp '16, ACM Press, http://doi.org/10.1145/2971648.2971706, Sep. 12-16, 2016, pp. 934-939.

Özdamar et al., "A survey on the resource-constrained project scheduling problem", IIE Transactions, vol. 27, No. 5, http://doi.org/10.1080/07408179508936773, 1995, pp. 574-586.

\* cited by examiner

Figure 4

| | |
|---|---|
| Task Diversity | *Task_Value* |
| Group Importance | *Group_Value* |
| Worker1<br>Section1<br>Section2<br>Section3<br>⋮ | *Exp_ValueA*<br>*Exp_ValueB*<br>*Exp_ValueC*<br>⋮ |
| Worker2<br>Section1<br>Section2<br>Section3<br>⋮ | *Exp_ValueD*<br>*Exp_ValueE*<br>*Exp_ValueF*<br>⋮ |
| Worker3<br>Section1<br>Section2<br>Section3<br>⋮ | *Exp_ValueG*<br>*Exp_ValueH*<br>*Exp_ValueI*<br>⋮ |
| ⋮ | ⋮ |

AUTOMATED DISTRIBUTION OF SUBTASK ASSIGNMENTS TO USER DEVICES

CROSS-REFERENCE TO RELATED APPLICATIONS

This application claims priority benefit of the United States Provisional Patent Application titled, "AUTOMATICALLY DISTRIBUTING ASSEMBLY TASKS AMONG WORKERS TO IMPROVE COORDINATION," filed on Jan. 6, 2017 and having Ser. No. 62/443,618. The subject matter of this related application is hereby incorporated herein by reference.

BACKGROUND OF THE INVENTION

Field of the Invention

The present invention generally relates to computer science and computer networks, more specifically, to automatically distributing subtask assignments to user devices.

Description of the Related Art

Physical assembly tasks, such as building and home construction, furniture assembly, toy kit construction, and the like, are often carried out by small or large groups of co-located workers. With the exception of professional settings that involve an experienced site manager, like a construction foreman, the coordination of different jobs amongst workers can be quite challenging. The workers must spend time dividing and assigning subtasks, locating and sharing tools, determining what order subtasks should be completed, and determining how to execute instructions to complete each subtask. Consequently, an inordinate amount of time can be spent at the beginning of a given physical assembly task to coordinate and assign subtasks among workers. In fact, in some cases, the time spent working on and completing the actual physical assembly task may be only a fraction of the total time spent organizing, managing, and executing the physical assembly task. Because, physical assembly tasks performed by groups of workers are oftentimes carried out and completed in inefficient ways, such tasks can likely benefit from an automated form of work distribution.

Conventional automated work distribution techniques are generally confined to the industrial domain where physical assembly tasks are oftentimes carried out by groups of robots. A large body of work has focused on computerized techniques to optimally allocate subtasks among such robots. One drawback of this work is that computerized algorithms designed for robots do not take into account the individual differences that typically exist across human workers or human-based constraints and factors. For example, a conventional algorithm designed for a group of robots may assume that each robot has identical capabilities or can perform the same subtask in the same amount of time. Such assumptions do not hold across different human workers. Further, conventional algorithms designed for groups of robots do not take into account human-based factors, such as personal engagement or satisfaction, repetitive strain, team building, and the like. In general, conventional algorithms and techniques designed for groups of robots do not include any human-based parameters. Thus, conventional algorithms and techniques for groups of robots may generate sub-optimal or erroneous subtask assignments when applied to human workers.

As the foregoing illustrates, what is needed in the art are more effective techniques for automatically distributing subtask assignments across a group of human workers.

SUMMARY OF THE INVENTION

Various embodiments include a computer-implemented method for determining and distributing subtask assignments for a task that is divisible into a plurality of subtasks. The computer-implemented method, includes assigning, at an assignment server, a first subtask to a first worker included in a plurality of workers based, at least in part, on a first value indicating a prior work experience of the first worker, wherein the first worker is associated with a first user device and assigning, at the assignment server, a second subtask to a second worker included in the plurality of workers based, at least in part, on a second value indicating a prior work experience of the second worker, wherein the second worker is associated with a second user device, and the second value is different than the first value. The computer-implemented further includes transmitting, via a network, the first subtask to the first user device and the second subtask to the second user device.

At least one advantage of the disclosed techniques is that individual differences of human workers are accounted for when determining subtask assignments for a group of workers. For example, the disclosed technique may consider the prior work experience for each worker when determining the subtask assignments for the group of workers. Thus, the disclosed technique provides a technological improvement and technological advancement over prior approaches as the disclosed technique may generate improved and more precise subtask assignments that are specific and appropriate for each individual worker in comparison to prior techniques, which do not consider differences or variability between human workers. The disclosed technique provides a technological improvement and technological advancement over prior approaches as the disclosed technique may generate subtask assignments for a group of human workers that enable a task to be completed more efficiently and with higher quality than in previous techniques.

Another advantage of the disclosed technique is that it accounts for human-based parameters. For example, the disclosed technique may consider task diversity which prioritizes assigning workers a variety of subtasks and group importance which biases the technique towards assigning multiple workers to a same subtask. Thus, the disclosed technique provides a technological improvement and technological advancement over prior approaches as the disclosed technique may generate improved subtask assignments that increase personal engagement/interest, produce higher quality work, prevent repetitive strain, and/or emphasize team work and team building in comparison to conventional techniques that do not account for human-based considerations.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 4 is a conceptual diagram of a parameters table implemented in the subtask assignment system of FIG. 1, according to various embodiments;

DETAILED DESCRIPTION

Figure 1:
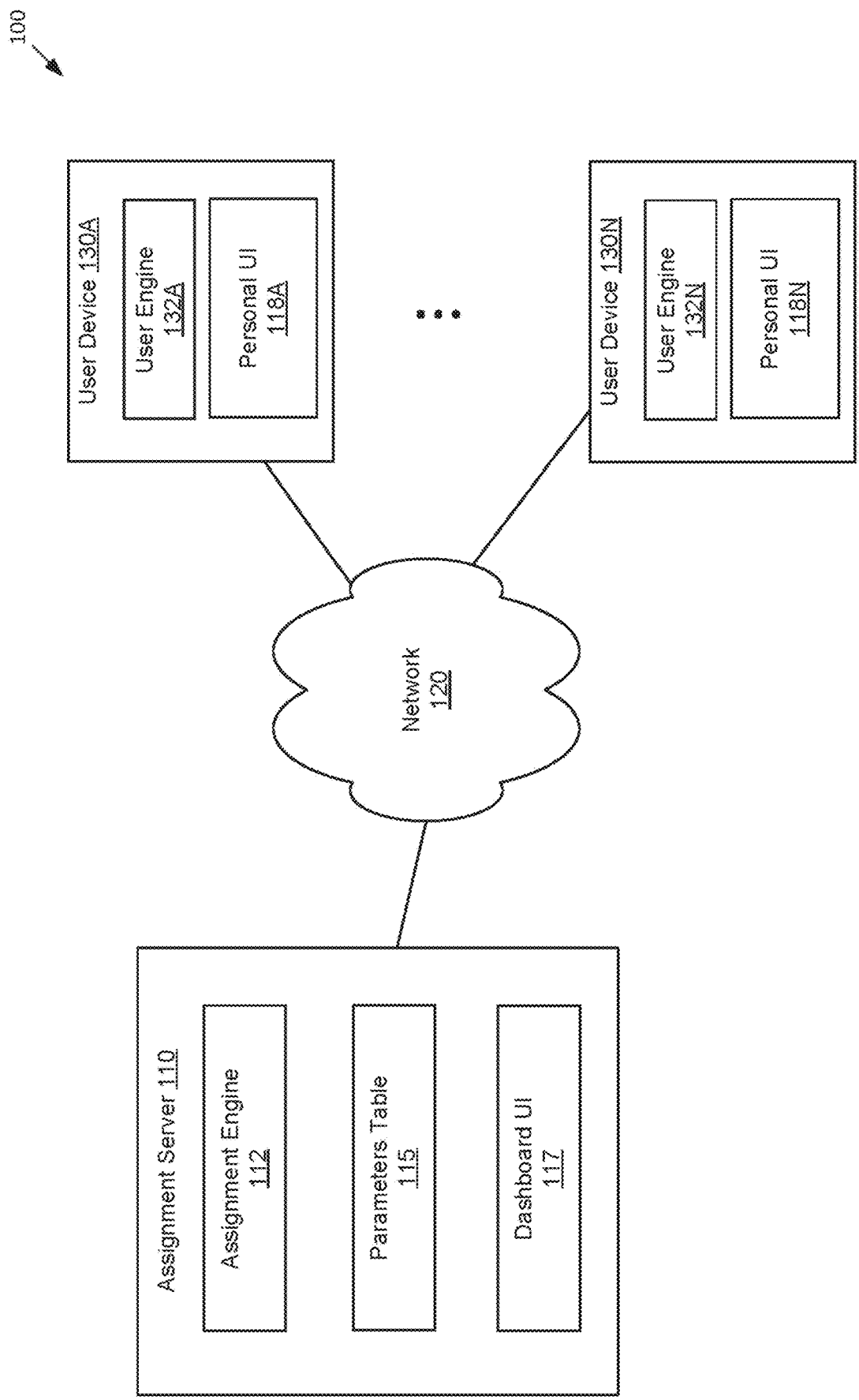
FIG. 1 illustrates a subtask assignment system configured to implement one or more aspects of the present invention.

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Embodiments described herein are directed towards a subtask assignment system for assisting groups of human workers complete an overall task more efficiently and with higher quality than in previous approaches. The overall task may comprise a task/job for physically assembling a physical article or object. The physical assembly task comprises a plurality of subtasks (sections) that must each be completed to complete the physical assembly task. The subtask assignment system may include an assignment server connected to a plurality of user devices via a network, each user device being operated by a particular worker. The assignment server may execute an assignment engine that receives inputs describing the overall task and group of workers, generates a task model representing the task based on the inputs, populates a parameters table based on the inputs, and automatically determines subtask assignments for the group of workers based on the task model and the parameters table. In general, for every available worker/user, the assignment server determines the optimal subtask to assign to the worker/user based on various parameters, such as the worker's prior work experience, priority of task diversity, priority of group importance, and/or other parameters. The assignment server then distributes the determined subtask assignments to the group of workers via the plurality of user devices associated with the group of workers.

The prior work experience of each worker may be represented by a value within a range (e.g., 1 to 5) that is selected by the worker indicating the level of prior work experience relevant to a particular subtask. The priority of task diversity and the priority of group importance may each be represented by a value which is selected by an administrator. For example, if task diversity is set to 1, the assignment engine may prioritize giving workers a variety of different subtasks instead of repeating the same subtasks, which may increase personal engagement and satisfaction, produce higher quality work, and prevent repetitive strain injuries. In contrast, if task diversity is set to 0, the assignment engine may prioritize giving workers the same or similar subtasks, which can help workers learn specific skills and become more efficient at certain subtasks. For example, if group importance is set to 1, the assignment engine may prioritize assigning multiple workers to a same subtask (section), which may increase team work and team building. In contrast, if group importance is set to 0, the assignment engine may prioritize assigning a single worker to each subtask (section), which prioritizes working independently for workers to stay more focused.

The assignment engine may determine the subtask assignments for the workers dynamically and continuously adapt to any changes in the group of workers or the progress of the subtasks to maintain efficient distribution of subtask assignments. For example, the assignment engine may re-determine the subtask assignments whenever a new worker joins the task, a previous worker leaves the task, and/or a subtask is completed. The assignment engine may also generate and display a dashboard user interface (UI) that displays a task overview and provides a visualization of the entire task completion process.

The assignment engine may determine a subtask assignment that is specific to each worker, and distribute the subtask assignment to the worker by transmitting the subtask assignment to the worker's user device. The user device for each worker receives and displays a subtask assignment that is personalized and tailored for the individual worker, for example, depending on the worker's prior work experience and/or subtasks the worker has already excelled. The subtask assignment received and displayed at each user device may include step-by-step instructions for completing the subtask, as well as images or video relating to the subtask. When a worker completes a subtask, the worker enters an input indicating that the assigned subtask is completed via the user device, which transmits a "subtask complete" message to the assignment server. After each subtask is completed, the assignment engine may re-determine and re-distribute subtask assignments to the group of workers. The assignment engine may continue to re-determine and re-distribute subtask assignments until each subtask of the task is completed.

The subtask assignment system may be implemented for assisting groups of human workers to complete any variety of physical assembly task more efficiently, such as in small-scale tasks (such as toy building, furniture assembly, circuit board assembly, etc.), or to large-scale tasks (such as architectural construction, disaster relief, large art installations, building a prefabricated house, etc.). The subtask assignment system may also be implemented for completing physical assembly tasks that vary in the range of tools, materials, and required skills.

I. Subtask Assignment System

FIG. 1 illustrates a subtask assignment system 100 configured to implement one or more aspects of the present invention. As shown, the subtask assignment system 100 includes an assignment server 110 and a plurality of user devices 130 (e.g., 130A-130N) coupled via a network 120. Each user device 130 is associated with and corresponds to a particular human worker who operates the user device 130. In other embodiments, a single user device 130 may be associated with multiple human workers that share the single user device 130. The network 120 may comprise any technically feasible communications or information network, wired or wireless, that allows data exchange, such as a wireless (Wi-Fi) network, personal area network (such as Bluetooth, Wireless USB, IrDA, etc.), wide area network (WAN), a local area network (LAN), and/or the Internet, among others.

The assignment server 110 may comprise a computing device or machine, such as a server system, desktop computer, laptop computer, a smart phone, electronic tablet or any other type of computing device suitable for practicing various embodiments of the present invention. The user device 130 may comprise a computing device or machine, such as a mobile device, smartphone, smartwatch, smartglasses, laptop, tablet, or any other type of computing device suitable for practicing various embodiments of the present invention. The assignment server 110 and user device 130 comprise computer hardware components such as memory for storing software application(s) and data and processors that execute the software application(s) to provide processing engines that enable the operations and functions described herein. The computer hardware components of the assignment server 110 and user device 130 are discussed below in relation to FIGS. 7-8. In this regard, the assignment server 110 hosts and executes an assignment engine 112 and each user device 130 hosts and executes a user engine 132.

The assignment server 110 executes an assignment engine 112 and stores a table of parameters (parameters table 115) for performing embodiments herein. The assignment engine 112 may execute a subtask assignment algorithm that determines subtask assignments based, at least in part, on parameter values stored to the parameters table 115. The assignment engine may also generate and display a dashboard user interface (UI) 117 that displays a task overview and provides a visualization of the entire task completion process.

Each user device 130 is associated with a particular human worker and executes a user engine 132 that interacts with the assignment engine 112 via the network 120, and generates and displays a personal UI 118 to perform embodiments herein. For example, each user device 130 may connect to the IP address of the assignment server 110 and logon to the assignment server 110 by submitting the login name for the associated worker, receive a subtask assignment from the assignment engine 112, and display the subtask assignment on the personal UI 118. Each received subtask assignment may include step-by-step instructions for completing the subtask, as well as images or video relating to the subtask, which are displayed in the personal UI 118 of each user device 130. When a worker associated with a particular user device 130 completes a subtask, the worker enters a "subtask complete" input via the personal UI 118, and the user device 130 transmits a "subtask complete" message to the assignment server 110 for that subtask. In other embodiments, the assignment server 110 may receive a "subtask complete" message from one or more sensors or cameras that automatically detect when a subtask has been completed. For example, contact sensors on the assembly materials could detect when two parts are attached, or external 3D depth cameras, combined with computer vision algorithms, may be implemented to detect task progress. In general, the assignment server 110 and the plurality of user devices 130 work in conjunction to perform embodiments herein.

Figure 2:
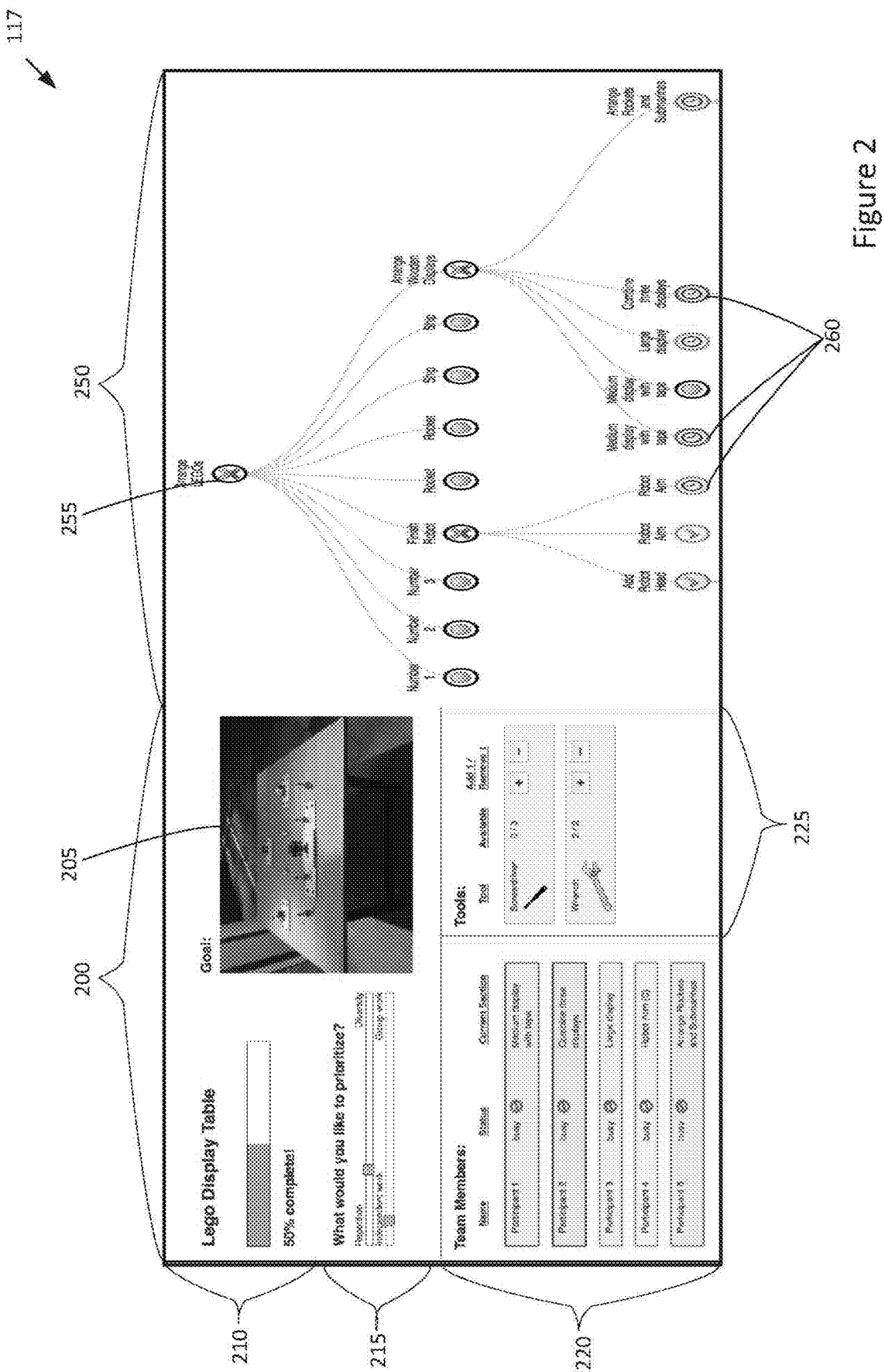
FIG. 2 shows a screenshot of the dashboard UI that can be implemented in the subtask assignment system of FIG. 1, according to various embodiments of the present invention.

FIG. 2 shows a screenshot of the dashboard UI 117 that can be implemented in the subtask assignment system of FIG. 1, according to various embodiments of the present invention. In general, the dashboard UI 117 displays a visualization of the overall process and structure of the task and provides high-level task information to promote group awareness. As shown, the dashboard UI 117 comprises a left side 200 and a right side 250.

In some embodiments, the left side 200 of the dashboard UI 117 displays an image 205 of final goal, a progress bar 210, a set of parameter sliders 215, team information 220, and tool information 225. The image 205 of final goal may comprise an image of the overall completed task. The progress bar 210 indicates the proportion of work currently completed to the total work needed for completing the overall task. The set of parameter sliders 215 may enable an administrator to select values for particular parameters. In some embodiments, the set of parameter sliders 215 include a first slider for selecting a value for the priority of task diversity and a second slider for selecting a value for the priority of group importance. The team information 220 may display information regarding each worker in the team of workers completing the task. For each worker, the team information 220 may display the worker's name, availability status, and the subtask/section of the task the worker is currently assigned and working to complete. For example, the availability status of a worker may display "busy" to indicate the worker is currently assigned to a subtask and unavailable to be assigned to another subtask and "free" to indicate the worker is not currently assigned to a subtask and available to be assigned to a subtask. The tool information 225 may display all tools required for completing the overall task, how many of each required tool is currently in use or available, and selectable buttons to update the quantity for each required tool (for example, if a tool is broken or a new tool is added).

In some embodiments, the right side 250 of the dashboard UI 117 displays a hierarchical tree graph (task tree) that visually represents the task. The hierarchical tree graph may comprise a root node 255 and a plurality of child nodes 260. The root node 255 represents the overall task to be completed, the task comprising a plurality of subtasks/sections that must each be completed for the task to be completed. In other embodiments, the root node 255 may represent the final subtask/section to be completed to complete the overall task. Each child node 260 represents a particular subtask/section of the overall task. Particular subtasks may have dependencies on other subtasks which must be completed before work on the particular subtasks may begin. Thus, child nodes may represent subtasks/sections required to be completed before a subtask/section represented by a parent node may be started. The hierarchical tree graph may represent subtasks having dependencies with nodes having a first color (e.g., red) and represent subtasks having no dependencies with nodes having a second color (e.g., green) to differentiate these subtasks. Subtasks/nodes having dependencies are considered "available" and ready to be assigned by the assignment engine 112. Subtasks/nodes having dependencies on other subtasks/nodes that are not completed are not considered "available" and not ready to be assigned by the assignment engine 112.

Figure 3:
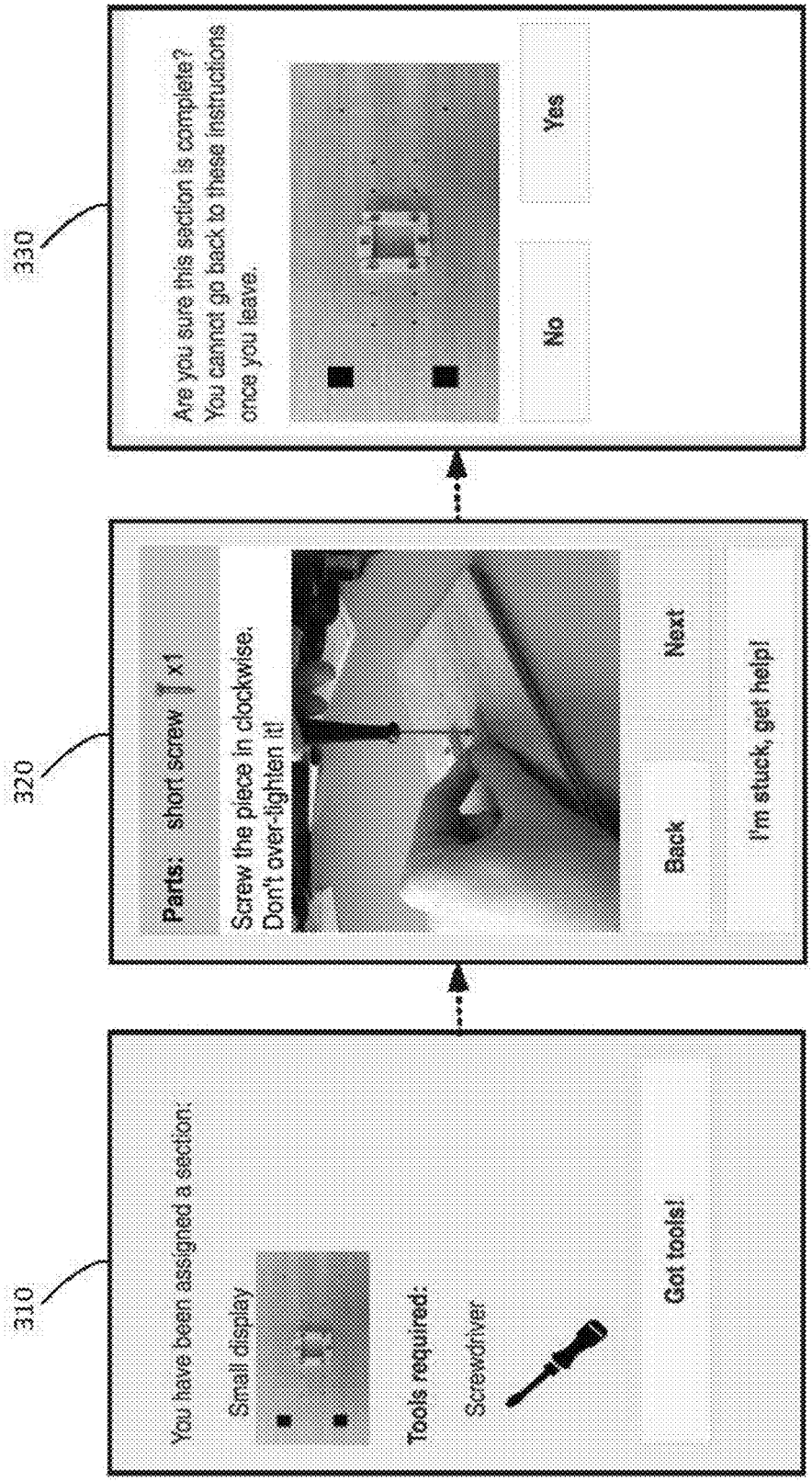
FIG. 3 shows different screenshots of the personal UI that can be implemented in the subtask assignment system of FIG. 1, according to various embodiments of the present invention.

FIG. 3 shows different screenshots of the personal UI 118 that can be implemented in the subtask assignment system of FIG. 1, according to various embodiments of the present invention. In general, the personal UI 118 is displayed on a user device 130 associated with a particular worker to display various information for a subtask assigned to the worker and also receive inputs/commands from the worker relating to the assigned subtask.

As shown, a first screenshot 310 of the personal UI 118 displays a notification when the worker is first assigned a subtask, the notification including the name of the subtask (e.g., "small display") and tools required for completing the subtask. A second screenshot 320 of the personal UI 118 displays information regarding a first step of the assigned subtask, which may include a text description of the first step and/or an image or video illustrating how to perform the first step. When the worker has completed the first step, the personal UI 118 may receive a user input indicating that the first step is completed (e.g., user selection of the "Next" button). In response, the personal UI 118 may display information regarding a second step of the assigned subtask (not shown), and so forth until all steps of the assigned subtask are completed. A third screenshot 320 of the personal UI 118 displays information regarding the completion of the assigned subtask, which may include an image or video illustrating how the completion of the assigned subtask should appear. When the worker has completed the assigned subtask, the personal UI 118 may receive a user input indicating that the assigned subtask is completed (e.g., user selection of the "Yes" button). In response, the user device 130 may transmit a "subtask complete" message to the assignment server 110 indicating that the subtask assigned to the worker and user device 130 is completed.

II. Determining and Distributing Subtask Assignments

The assignment engine 112 residing on the assignment server 110 may execute a subtask assignment algorithm that determines subtask assignments for a group of workers. In general, the assignment engine 112 may receive a plurality of inputs describing the overall task and group of workers, generates a task model representing the task based on the inputs, populates a parameters table 115 based on the inputs, and executes the subtask assignment algorithm that determines subtask assignments for the group of workers based on the task model and the parameters table 115. The assignment engine 112 then distributes the determined subtask assignments to the group of workers via the plurality of user devices 130.

The assignment engine 112 may receive the plurality of inputs describing the overall task and group of workers from an administrator. The plurality of inputs may include, for each subtask of a plurality of subtasks that comprise the task, text instructions (such as step-by-step instructions) for completing the subtask, an image, video, animation, or other multimedia item illustrating the completed subtask, a description of one or more tools required for the subtask, one or more skills required to complete the subtask, or any combination thereof. The plurality of inputs may include dependencies between the plurality of subtasks and the tools available for use by the group of workers. The plurality of inputs may also include, for each worker in the plurality of workers, a self-rating value of the worker's prior work experience for each skill required to complete each subtask. The prior work experience of each worker may be represented by a value within a range (e.g., 1 to 5) that is selected by the worker indicating the level of prior work experience relevant to skill required for a particular subtask. The plurality of inputs may further include a value for the priority of task diversity and a value for the priority of group importance. The values for the prior work experience, priority of task diversity, and priority of group importance may be used to populate the parameters table 115.

The assignment engine 112 may then generate a task model representing the task based on the plurality of inputs. In the paradigm of the task model, a task T is defined by a set of sections (subtasks) comprising the task, a set of tools needed for the task, and a set of skills required for the task. In some embodiments, a task T is formally defined by equation (1) below:

$$T=\{\text{Sections, Tools, Skills}\} \quad (1)$$

where:

Sections=$\{S_1, S_2, \ldots, S_n\}$
Tools=$\{T_1, T_2, \ldots, T_m\}$
Skills=$\{K_1, K_2, \ldots, K_p\}$ Each Section $S_i$ comprises a subtask, the task comprising a plurality of subtasks $S_1, S_2, \ldots, S_n$. Each Section $S_i$ is further defined by a sequence a sequence of steps (Steps$_i$) to complete the Section $S_i$, the tools (Tools$_i$) required by each worker to complete the Section $S_i$, the type of skills (Skills$_i$) required to complete the Section $S_i$, the minimum (Min$_i$) and maximum (Max$_i$) number of workers that can work on the Section $S_i$, and the sections that must be complete for this Section $S_i$ to begin (Dependencies$_i$). In some embodiments, each Section $S_i$ section is formally defined by equation (2) below:

$$S_i=\{\text{Steps}_i, \text{Tools}_i, \text{Skills}_i, \text{Max}_i, \text{Min}_i, \text{Dependencies}_i\} \quad (2)$$

where:

Steps$_i$=$\{\text{step}_{1i}, \text{step}_{2i}, \ldots, \text{step}_{qi}\}$
Tools$_i[j]$=$\{x|\text{Tool } T_x \text{ is required by the j}^{th} \text{ worker for section } S_i\}$
Skills$_i$=$\{y|\text{Skill } K_y \text{ is required for section } S_i\}$
Dependencies$_i$=$\{z|\text{section } S_z \text{ is a dependency of section } S_i\}$ The skills required for a section may be defined at a high level, such as experience with woodworking, or at a lower level, such as experience with specific tools. Min$_i$ is the minimum required number of workers for a section, while Max$_i$ is the maximum number of workers that could be a useful addition. The set of tools for each section (Tools$_i$) is a set of sets, as each subsequent worker may require a different set of tools. For example, if a second worker is required to hold a block while the first worker screws something in, then only the first worker needs a screwdriver.

The similarity between any two sections/subtasks may also be calculated as a value (e.g., between 0 and 1). The similarity between any two sections/subtasks is based on the number of common tools between the sections, to a maximum of 0.5, and is equal to 1 only if the sections are equivalent. In some embodiments, a similarity value indicating a similarity between two sections $S_i$ and $S_j$ is defined by equation (3) below:

$$\text{Similarity}(i, j) = \begin{cases} 1, \text{ if } S_i \stackrel{def}{=} S_j, \\ 0.5 \frac{\|\text{Tools}_i \cap \text{Tools}_j\|}{\text{Max}(\|\text{Tools}_i\|, \|\text{Tools}_j\|)}, \text{ otherwise.} \end{cases} \quad (3)$$

In addition to generating the task model, the assignment engine 112 may also populate a parameters table 115 based on the plurality of received inputs. FIG. 4 is a conceptual diagram of a parameters table 115 implemented in the subtask assignment system 100 of FIG. 1, according to various embodiments. The parameters table 115 includes a plurality of entries, each entry comprising a parameter field 410 specifying a particular parameter and a value field 420 specifying a corresponding value for the parameter.

The plurality of entries includes a diversity entry 430 for the priority of task diversity parameter. The value (e.g., 0 or 1) for the priority of task diversity may be selected by an administrator (e.g., via a parameter slider 215 of the dashboard UI 117). For example, if task diversity is set to 1, the assignment engine 112 may prioritize giving workers a variety of different subtasks instead of repeating the same subtasks, which may increase personal engagement and satisfaction, produce higher quality work, and prevent repetitive strain injuries. In contrast, if task diversity is set to 0, the assignment engine 112 may prioritize repetition of subtasks by assigning workers the same or similar subtasks, which can help workers learn specific skills and become more efficient at certain subtasks.

The plurality of entries also includes a group entry 440 for the priority of group importance parameter. The value (e.g., 0 or 1) for the priority of group importance may be selected by an administrator (e.g., via a parameter slider 215 of the dashboard UI 117). For example, if group importance is set to 1, the assignment engine may prioritize assigning multiple workers to a same section/subtask, which may increase team work and team building. In contrast, if group importance is set to 0, the assignment engine may prioritize assigning a single worker to each section/subtask, which prioritizes working independently for workers to stay more focused.

Thus, as described above, another advantage of the disclosed technique is that it accounts for human-based parameters. For example, the disclosed technique may consider task diversity which prioritizes assigning workers a variety of subtasks (which can increase engagement, produce higher quality work, and prevent repetitive strain) and group priority which biases the technique towards assigning multiple workers to a same subtask (which can emphasize team work and team building). Thus, the disclosed technique may generate improved subtask assignments that increase personal engagement/interest, produce higher quality work, prevent repetitive strain, and/or emphasize team work and team building in comparison to conventional techniques that do not account for human-based parameters and considerations.

The parameters table 115 also includes a plurality of worker entries 450 (such as 450a, 450b, 450c, etc.), each worker entry 450 being associated with a particular worker in the group. Each worker entry 450 includes a login name 460 (such as 460a, 460b, 460c, etc.) for the associated worker and a set of field/value pairs 470 (such as 470a, 470b, 470c, etc.) for specifying the prior work experience of the associated worker relevant to each section/subtask. The worker and corresponding user device 130 may be identified by the login name 460, which is transmitted by the user device 130 to the assignment server 110 when connecting and logging into the assignment server 110. The set of field/value pairs 470 includes, for each section/subtask, a value representing the prior work experience of the worker for a skill required to complete the section/subtask. The prior work experience for each section/subtask may be represented by a value within a range (e.g., 1 for no experience to 5 for very experienced) that is selected by the worker. If a particular section/subtask requires two or more skills, the worker may submit a separate value for each skill, and the average of these values may be stored to the set of field/value pairs 470. In some embodiments, the values for the prior work experience of the workers may vary among different workers and/or vary for different subtasks. For example, a first value indicating a prior work experience of a first worker for a first subtask may be different than a second value indicating a prior work experience of a second worker for the first subtask.

Thus, as described above, another advantage of the disclosed technique is that it accounts for individual differences of human workers in work experience when determining subtask assignments for a group of workers. For example, the disclosed technique may consider the prior work experience for each worker when determining the subtask assignments for the group of workers. Thus, the disclosed technique may generate improved and more precise subtask assignments that are specific and appropriate for each individual worker in comparison to conventional techniques, which do not consider differences or variability between workers. Thus, the disclosed technique may generate subtask assignments for a group of human workers that enable a task to be completed more efficiently and with higher quality than in previous techniques.

Figure 5:
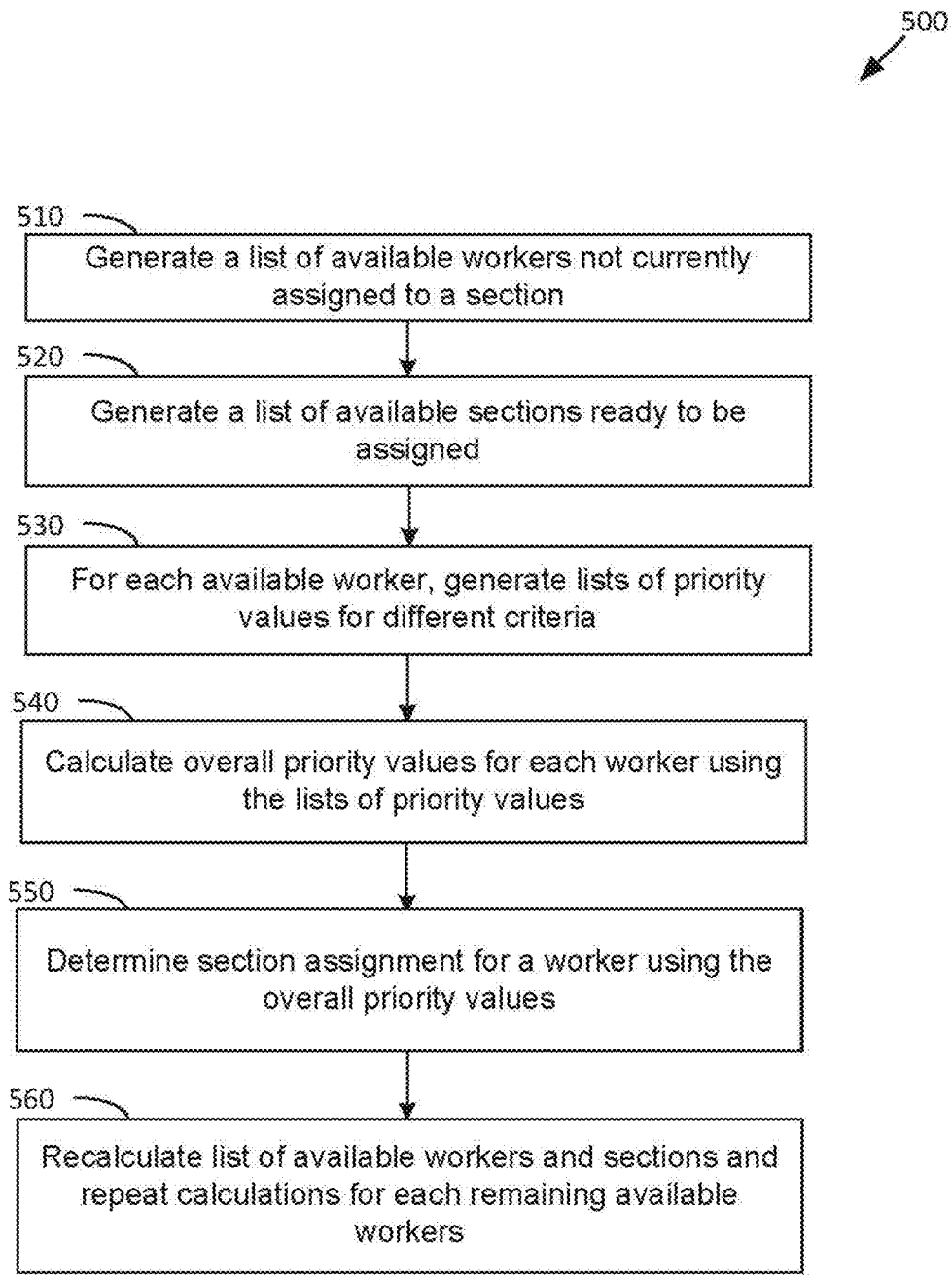
FIG. 5 illustrates a flow diagram of method steps for a subtask assignment algorithm for determining subtask assignments, according to various embodiments of the present invention.

The assignment engine 112 may then execute a subtask assignment algorithm that determines subtask assignments for the group of workers based on the task model and the parameters table 115. FIG. 5 illustrates a flow diagram of method steps for a subtask assignment algorithm for determining subtask assignments, according to various embodiments of the present invention. Although the method steps are described in conjunction with the systems of FIGS. 1-4, persons skilled in the art will understand that any system configured to perform the method steps, in any order, is within the scope of the invention. In some embodiments, the method 500 may be performed by the assignment engine 112 executing on the assignment server 110. As discussed below, the method 500 may be performed at various stages of the task process, such as the beginning of the task process, when a section is completed, or when a new worker is added to the group. In general, for every available worker/user, the method 500 determines the optimal section to assign to the worker/user based on various parameters, such as the worker's prior work experience, priority of task diversity, priority of group importance, and/or other parameters.

The method 500 begins when the assignment engine 112 generates (at step 510) a list of available workers/users $U=\{u_1, u_2, \ldots, u_n\}$ who are not currently assigned to a section/subtask. If the method 500 is being performed at the beginning of the task process, the list of available workers comprises all workers in the group. At step 520, the assignment engine 112 generates a list of available sections $A=\{S_1, S_2, \ldots, S_m\}$ ready to be assigned to workers. In some embodiments, a particular section is considered available if the tools required for the section are available, it is currently unassigned to any workers or currently assigned but assigned to less than the maximum number of workers for the section, and the section has no dependencies on any other sections (i.e., other sections do not need to be completed before work on the particular subtasks may begin). If the method 500 is being performed at the beginning of the task process, the list of available sections comprises all sections of the task.

At step 530, for each available worker/user $u_i$, the assignment engine 112 generates several lists $P_i$ of priority values $\{p_{i1}, p_{i2}, \ldots, p_{iq}\}$ where $p_{ij}$ is the priority value for assigning worker/user $u_i$ to section $S_j$. If the method 500 is being performed at the beginning of the task process when no sections have been completed, the assignment engine generates (at step 530) one list for each of the following criteria: Tree Depth ($P_D$), Group ($P_G$), and Prior Experience ($P_E$).

For the Tree Depth ($P_D$) criterion, $P_D[j]$ is the depth of section $S_j$ within the hierarchical tree graph (task tree) that visually represents the task. A particular section with larger depth is prioritized over another section with a smaller depth, because the particular section with a larger depth is a section that is further down the task tree, and thus has more sections that are potentially waiting on the particular section to be completed. Therefore, sections with larger depth should be prioritize to have these sections assigned and completed before other sections with smaller depth. For the Group ($P_G$) criterion, if individual work is being prioritized (e.g., the value for priority of group importance is set to 0), then $P_G[j]$ is set to 1 for all unassigned sections (as these sections do not yet have any workers assigned to them) and set to 0 for all sections that are already assigned to at least one worker (where a worker/user would be joining the at least one worker already assigned). For the Group ($P_G$) criterion, if group work is being prioritized (e.g., the value for priority of group importance is set to 1), then $P_G[j]$ is set to 0 for all unassigned sections and set to 0 for all sections that are already assigned to at least one worker. For the Prior Experience ($P_E$) criterion, $P_E[j]$ is the worker's prior work experience (e.g., a value between 1 and 5) for the skill required by section $S_j$.

If the method 500 is being performed during the task process when a particular worker has just completed a particular section $S_C$, in addition to the three criteria above, the assignment engine 112 also generates (at step 530) one list for each of the following criteria: Next Section ($P_N$), Repetition/Diversity ($P_R$), and Speed ($P_S$).

For the Next Section ($P_N$) criterion, $P_N[j]$ is set to 1 if section $S_j$ is the next section to be completed after section $S_C$ (section $S_j$ is the parent node of section $S_C$ in the task tree), and $P_N[J]$ is set to 0 otherwise. In this manner, overall continuity of section assignments is prioritized. For the Repetition/Diversity ($P_R$) criterion, if repetition of assigned sections is being prioritized (e.g., the value for priority of task diversity is set to 0), then $P_R[$ ]i is set to the similarity value Similarity(j,c) which indicates a similarity between sections $S_j$ and $S_C$. For the Repetition/Diversity ($P_R$) criterion, if repetition of assigned sections is being prioritized (e.g., the value for priority of task diversity is set to 1), then $P_R[j]$ is set to 1−Similarity(j,c). For the list generated for the Speed ($P_S$) criterion, this list prioritizes sections the worker/user has already excelled at (completed the sections relatively less time than normal). For each available section $S_j$, the assignment engine 112 may calculate an average time all workers have taken on all currently completed sections, weighted by their similarity to section $S_j$, and the average time the current worker/user has taken, whereby $P_S[j]$ is set to the difference between the two averages.

At step 540, using the lists $P_i$ of priority values for the various criteria generated for each available worker/user $u_i$, the assignment engine 112 then calculates the overall priority values $P_{itotal}$ for each worker/user $u_i$. The assignment engine 112 may do so by normalizing the values for each generated list and adding/summing the values element-wise, as represented by equation (4) below:

$$P_{itotal} = P_{iD} + P_{iG} + P_{iE} + P_{iN} + P_{iR} + P_{iS} \quad (4)$$

Note that equation (4) gives each criteria equal weight. In other embodiments, parameters may be used to give each criterion different weights, wherein a determination is made as to which of these parameters should have the greatest influence. Further note that if the method 500 is being performed at the beginning of the task process when no sections have been completed, the assignment engine 112 only considers the criteria for Tree Depth ($P_D$), Group ($P_G$), and Prior Experience ($P_E$), whereby $P_{itotal}$ is represented by equation (5) below:

$$P_{itotal} = P_{iD} + P_{iG} + P_{iE} \quad (5)$$

At step 550, the assignment engine 112 implements a greedy algorithm to determine the section assignments, whereby the assignment engine 112 determines the worker/user having the single highest priority value in all of the $P_{itotal}$ lists across all workers/users, and assigns that user to the corresponding section.

At step 560, the assignment engine 112 recalculates the list of available workers/users and available sections and repeats the method 500 for the remaining available workers/users, until all users have been assigned to a section. The method 500 then ends.

Following is a simple example of one iteration of the subtask assignment algorithm to illustrate how a next assigned section/subtask is determined for a particular worker. In this example, assume that that priority of task diversity and priority of group importance are both set to 0 and there are two workers, X and Y. Also assume that the overall task is building a robot, where a task tree representing the overall task comprises three depth levels. At the first depth level is a root node subtask comprising Finishing the Robot which has three child node subtasks at the second depth level: Add Robot Head, Robot Arm, and Robot Arm (2). The child node subtask Add Robot Head also has three child node subtasks at the third depth level: Robot Body, Robot Shoulder, Robot Shoulder (2). Thus, child node subtask Add Robot Head has dependencies on the three child node subtasks which must each be completed before work can begin on the subtask Add Robot Head. In the example, worker X is currently assigned to and working on the node subtask Robot Body and worker Y has completed node subtask Robot Shoulder. Thus, the subtask assignment algorithm is triggered to determine the next section/subtask to assign to worker Y.

To determine the next section/subtask to assign, the subtask assignment algorithm determines that the list of available workers U={Y} and the list of available sections/subtasks A={Robot Body, Robot Shoulder (2), Robot Arm, Robot Arm (2)}. Note that subtask Robot Body is included as an available section even though worker X is already assigned and working on the subtask. This is because the maximum number of workers that can work on this subtask ($Max_i$) is set to 2, so a second worker can potentially join. The subtask assignment algorithm then determines, for worker Y, a priority list for each above criterion with priority values corresponding to each section listed in A.

For example, for the Tree Depth ($P_D$) criterion, the subtask assignment algorithm determines that $P_D$={3, 3, 2, 2} since the first two subtasks (Robot Body and Robot Shoulder (2)) are each at a depth level of 3 in the task tree, and the next two subtasks (Robot Arm and Robot Arm (2)) are each at a depth level of 2 in the task tree. For the Group ($P_G$) criterion, the subtask assignment algorithm determines that $P_G$={0, 1, 1, 1} since individual work is being prioritized, and subtask Robot Body is the only section already in progress. For the Prior Experience ($P_E$) criterion, assume user Y has a prior experience value of ⅗ for the skills relevant to all available subtasks A. Thus, the subtask assignment algorithm determines that $P_E$={3, 3, 3, 3}. For the Next Section ($P_N$) criterion, the subtask assignment algorithm determines that $P_N$={0, 0, 0, 0} since the parent node subtask of Robot Shoulder (which worker Y just completed) is not included in the list of available sections A, since the parent node subtask (Add Robot Head) is still waiting on other dependencies to complete. For the Repetition/Diversity ($P_R$) criterion, since repetition is being prioritized in this example, the subtask assignment algorithm sets each value of $P_R[j]$ to Similarity(j,c) where section $S_c$ is the section/subtask that worker Y just completed (Robot Shoulder). Therefore, $P_R$={0.5, 1, 0.5, 0.5} since the second section (Robot Shoulder (2)) is the same as section Robot Shoulder, and all other sections require the same number of tools as section $S_c$ (i.e., no tools). In this example, the Speed ($P_S$) criterion does not affect the section assignment since the only completed subtask so far is Robot Shoulder which has only been completed once by worker Y. Therefore, the difference between the average time all workers have taken and the average time worker Y has taken will be zero (since these times are the same). Thus, $P_S$={0, 0, 0, 0}.

To calculate the overall priority values $P_{Ytotal}$ the subtask assignment algorithm normalizes the values for each generated list above and adds the normalized values together element-wise. Thus, the below calculations are performed by the subtask assignment algorithm:

$$P_{Ytotal} = P_D + P_G + P_E + P_N + P_R + P_S$$
$$= \{0.3, 0.3, 0.2, 0.2\} + \{0, 0.3, 0.3, 0.3\} + \{0.25, 0.25, 0.25, 0.25\} +$$
$$\{0, 0, 0, 0\} + \{0.2, 0.4, 0.2, 0.2\} + \{0, 0, 0, 0\}$$
$$= \{0.75, 1.25, 0.95, 0.95\}$$

The subtask assignment algorithm determines that the highest priority value in this list is the second value (1.25) which corresponds with the second section Robot Shoulder (2). Thus, the subtask assignment algorithm assigns worker Y to Robot Shoulder (2) as the next section/subtask. This is a sensible choice given the parameters that are set, since repetition is prioritized and section Robot Shoulder (2) is identical to the one worker Y just completed (Robot Shoulder).

Figure 6:
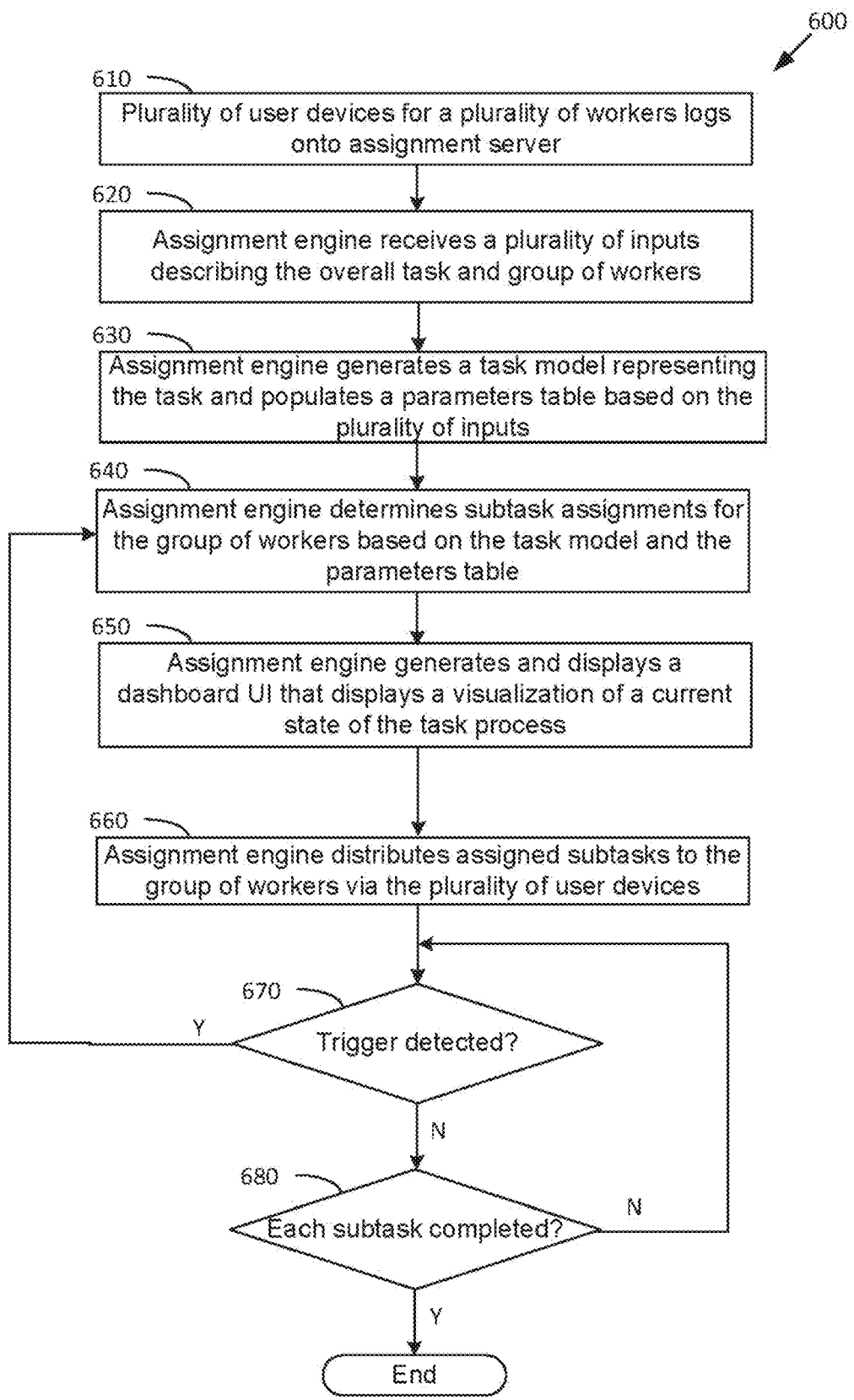
FIG. 6 illustrates a flow diagram of method steps for an overall process for completing a task, according to various embodiments of the present invention.

FIG. 6 illustrates a flow diagram of method steps for an overall process for completing a task, according to various embodiments of the present invention. Although the method steps are described in conjunction with the systems of FIGS. 1-4, persons skilled in the art will understand that any system configured to perform the method steps, in any order, is within the scope of the invention. In some embodiments, the method 600 may be performed by the assignment engine 112 executing on the assignment server 110 that works in conjunction with a plurality of user devices 130, each user device 130 associated with a particular human worker in a plurality of workers. The method 600 may be performed to complete an overall task comprising a plurality of subtasks/sections.

The method 600 begins when the plurality of user devices 130 logs onto (at step 610) the assignment server 110. For example, each user device 130 may connect to the IP address of the assignment server 110 and logon to the assignment server 110 by submitting the login name for the associated worker. At step 620, the assignment engine 112 receives a plurality of inputs describing the overall task and group of workers. The plurality of inputs include, for each subtask, text instructions, a multimedia item illustrating the completed subtask, tools required for the subtask, skills required for the subtask, or any combination thereof. The plurality of inputs may also include dependencies between the plurality of subtasks, tools available for use, prior work experience rating for each worker relevant to each subtask, priority of task diversity, priority of group importance, or any combination thereof. At step 630, the assignment engine 112 generates a task model representing the task and populates a parameters table 115 based on the plurality of inputs.

At step 640, the assignment engine 112 executes a subtask assignment algorithm that determines subtask assignments for the group of workers based on the task model and the parameters table 115. In general, for every available worker/user, the assignment server determines the optimal subtask to assign to the worker/user device based on various parameters, such as the worker's prior work experience relevant to the subtasks, priority of task diversity, priority of group importance, and/or other parameters. At step 650, the assignment engine 112 generates and displays a dashboard UI 117 that shows a visualization of a current state of the overall task process. For example, the dashboard UI 117 may display an image 205 of final goal, a progress bar 210, a set of parameter sliders 215, team information 220, tool information 225, and a hierarchical tree graph (task tree) that visually represents the task that each reflect the most recent information and most current state of the overall task process.

At step 660, the assignment engine 112 distributes the assigned subtasks to the group of workers via the plurality of user devices 130. In particular, for each subtask assigned to a particular worker/user device 130, the assignment engine 112 may transmit text instructions for completing the subtask, a multimedia item illustrating the completed subtask, a description of one or more tools required for the subtask, or any combination thereof. Each user device 130 receiving an assigned subtask then displays information related to the assigned subtask in a personal UI 118, such as the text instructions, multimedia item, and tools required for the subtask, or any combination thereof.

At step 670, the assignment engine 112 determines if a trigger to re-determine and re-distribute the subtask assignments for the group of workers is detected. For example, a trigger to re-determine and re-distribute the subtask assignments may comprise a subtask being completed, a new worker joining the task, a previous worker leaving the task, and/or a change in the available tools. When a worker has completed an assigned subtask, the user device 130 for the worker may transmit a "subtask complete" message to the assignment server 110 indicating that the subtask assigned to the worker is completed. In some embodiments, where multiple workers are assigned the same subtask, the subtask is considered completed when each user device 130 for each worker transmits a "subtask complete" message to the assignment server 110. A new worker may join the task by logging onto the assignment server 110. A previous worker may leave the task by logging off the assignment server 110. A change in the number of available tools may comprise new tools that are added or old tools that are lost or broken. The change in the number of available tools may be input via the dashboard UI 117. If any of these triggers are detected (at step 670) by the assignment engine 112, in response, the method 600 continues at step 640 to re-determines and re-distribute the subtask assignments for the group of workers. In this manner, the method 600 may dynamically determine and distribute the subtask assignments and continually adjust the subtask assignments according to new developments in the task process. If no trigger is detected (at step 670) by the assignment engine 112, the method 600 continues at step 680.

At step 680, the assignment engine 112 determines if each subtask of the overall task has been completed (e.g., by receiving a "subtask complete" message from the user devices 130 for each subtask of the overall task). If not, the method 600 proceeds to step 670. If so, the method 600 ends.

III. Assignment Server and User Devices

Figure 7:
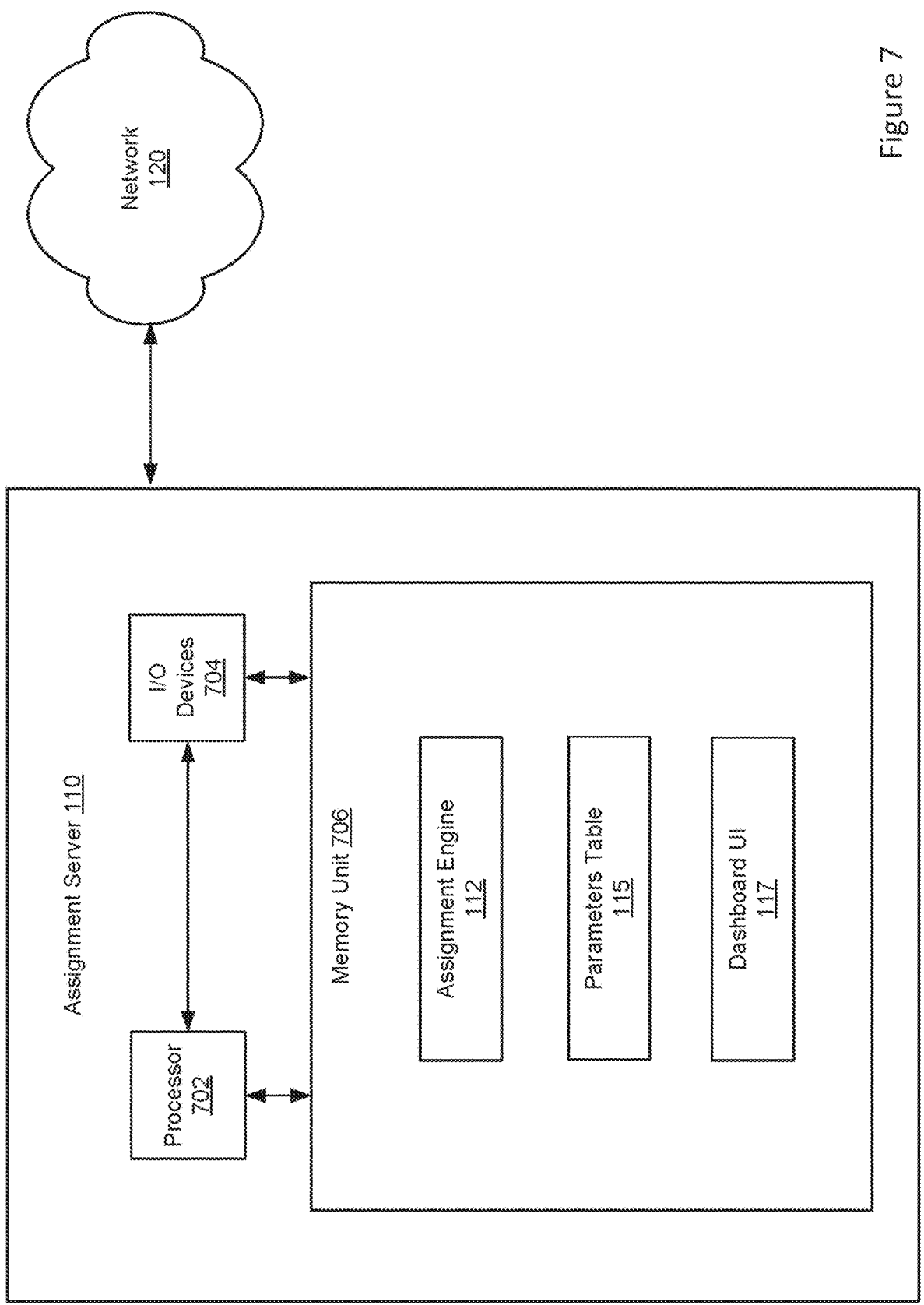
FIG. 7 illustrates an exemplary assignment server that can be implemented in the subtask assignment system of FIG. 1, according to various embodiments of the present invention.

FIG. 7 illustrates an exemplary assignment server 110 that can be implemented in the subtask assignment system of FIG. 1, according to various embodiments of the present invention. The assignment server 110 may comprise a computing device or machine, such as a server system, desktop computer, laptop computer, a smart phone, electronic tablet or any other type of computing device suitable for practicing various embodiments of the present invention. The assignment server 110 comprises at least one processor 702, input/output (I/O) devices 704, and a memory unit 706, coupled together. The assignment server 110 is coupled to a network 120 via a network interface (not shown). The network 120 may comprise any technically feasible communications or information network, wired or wireless, that allows data exchange, such as a wireless (Wi-Fi) network, personal area network (such as Bluetooth, Wireless USB, IrDA, etc.), wide area network (WAN), a local area network (LAN), and/or the Internet, among others.

Processor 702 may be a central processor (CPU), a graphics processor (GPU), an application-specific integrated circuit (ASIC), a field-programmable gate array (FPGA), and so forth. Processor 702 may also be a combination of different processors, such as a CPU configured to operate in conjunction with a GPU, or many CPUs configured to work together through cloud computing. In general, processor 702 may be any technically feasible processing device or hardware unit capable of processing data and executing software applications and program code. The processor 702 executes the software and performs the functions and operations set forth in the embodiments described herein.

Memory 706 is configured to store software application(s) and data. Instructions from the software constructs within the memory 706 are executed by processors 702 to enable the inventive operations and functions described herein. In various embodiments, the memory 706 is configured to store an assignment engine 112, parameters table 115, and dashboard UI 117. In some embodiments, the assignment engine 112 may be implemented as a Node.js application running on the assignment server 110, whereby task information is stored on the assignment server 110 in JSON format. The application may use web sockets to communicate with each user device 130, implemented using the socket.io module. In general, any user device 130 with a web browser can logon to the assignment server 110 by navigating to the server's IP address. Memory 706 may include a hard disk, a random access memory (RAM) module, a flash memory unit, or any other type of memory unit or combination thereof. Processor 702 and I/O devices 704 are configured to read data from and write data to memory 706.

I/O devices 704 are also coupled to memory 706 and may include devices capable of receiving input, such as a keyboard, a mouse, a trackball, and so forth, as well as devices capable of providing output, such as a display, speaker, and so forth. Additionally, I/O devices may include devices capable of both receiving input and providing output, such as a touchscreen, a universal serial bus (USB) port, and so forth. In particular, the I/O devices may further include a display monitor that displays the dashboard UI 117.

Figure 8:
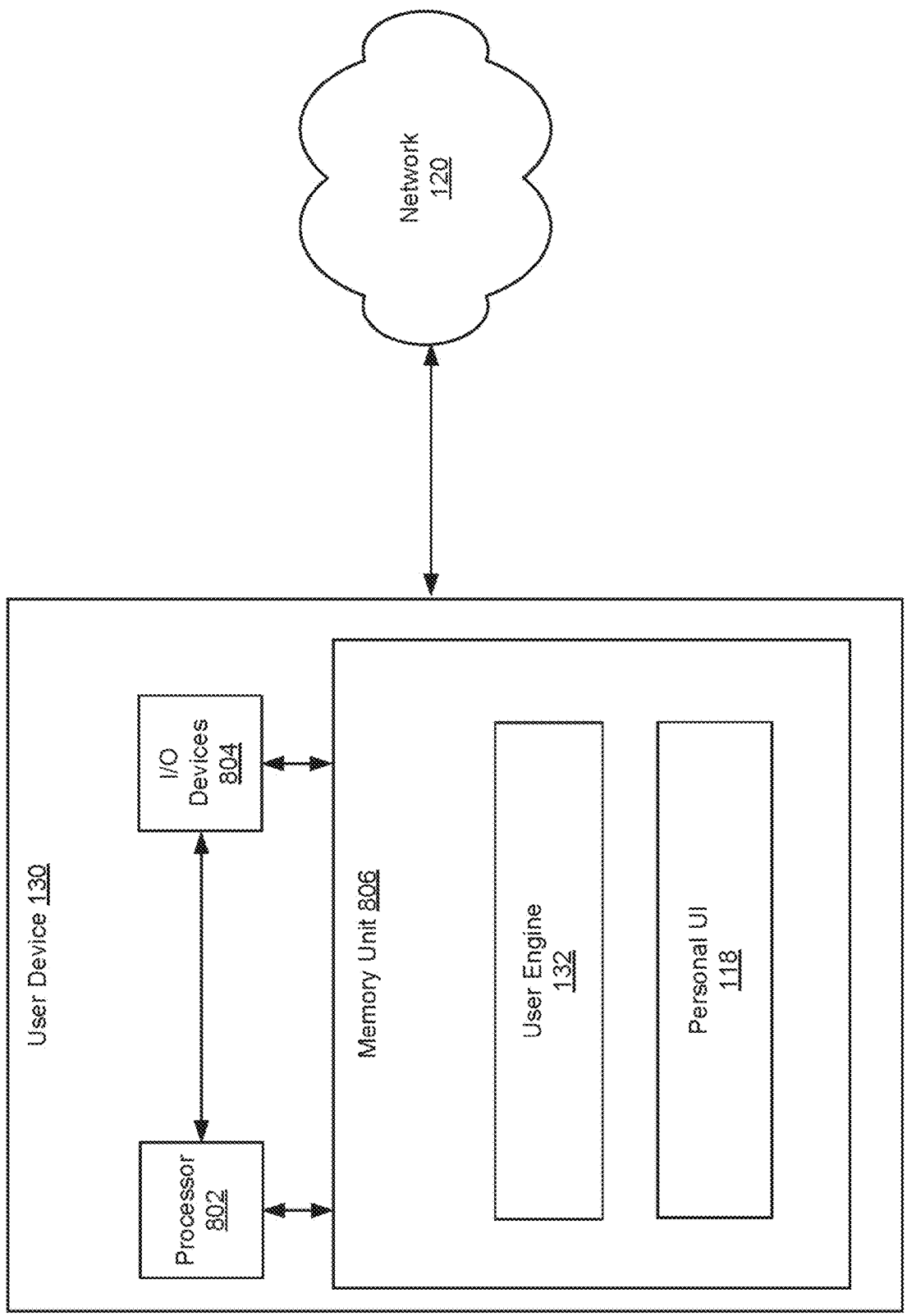
FIG. 8 illustrates an exemplary user device that can be implemented in the subtask assignment system of FIG. 1, according to various embodiments of the present invention.

FIG. 8 illustrates an exemplary user device 130 that can be implemented in the subtask assignment system of FIG. 1, according to various embodiments of the present invention. The user device 130 may comprise a computing device or machine, such as a mobile device, smartphone, smartwatch, smartglasses, laptop, tablet, or any other type of computing device suitable for practicing various embodiments of the present invention. The user device 130 comprises at least one processor 802, input/output (I/O) devices 804, and a memory unit 806, coupled together. The user device 130 is coupled to a network 120 via a network interface (not shown).

Processor 802 may be a central processor (CPU), a graphics processor (GPU), an application-specific integrated circuit (ASIC), a field-programmable gate array (FPGA), and so forth. Processor 802 may also be a combination of different processors, such as a CPU configured to operate in conjunction with a GPU, or many CPUs configured to work together through cloud computing. In general, processor 802 may be any technically feasible processing device or hardware unit capable of processing data and executing software applications and program code. The processor 802 executes the software and performs the functions and operations set forth in the embodiments described herein.

Memory 806 is configured to store software application(s) and data. Instructions from the software constructs within the memory 806 are executed by processors 802 to enable the inventive operations and functions described herein. In various embodiments, the memory 806 is configured to store an user engine 132 and a personal UI 118. Memory 806 may include a hard disk, a random access memory (RAM) module, a flash memory unit, or any other type of memory unit or combination thereof. Processor 802 and I/O devices 804 are configured to read data from and write data to memory 806.

I/O devices 804 are also coupled to memory 806 and may include devices capable of receiving input, such as a keyboard, a mouse, a trackball, and so forth, as well as devices capable of providing output, such as a display, speaker, and so forth. Additionally, I/O devices may include devices capable of both receiving input and providing output, such as a touchscreen, a universal serial bus (USB) port, and so forth. In particular, the I/O devices may further include a display monitor that displays the personal UI 118.

In sum, embodiments described herein are directed towards a subtask assignment system for assisting groups of human workers complete an overall task more efficiently and with higher quality than in previous approaches. The overall task may comprise a task/job for physically assembling a physical article or object. The physical assembly task comprises a plurality of subtasks (sections) that must each be completed to complete the physical assembly task. The subtask assignment system may include an assignment server connected to a plurality of user devices via a network, each user device being operated by a particular worker. The assignment server may execute an assignment engine that receives inputs describing the overall task and group of workers, generates a task model representing the task based on the inputs, populates a parameters table based on the inputs, and automatically determines subtask assignments for the group of workers based on the task model and the parameters table. In general, for every available worker/user, the assignment server determines the optimal subtask to assign to the worker/user based on various parameters, such as the worker's prior work experience, priority of task diversity, priority of group importance, and/or other parameters. The assignment server then distributes the determined subtask assignments to the group of workers via the plurality of user devices associated with the group of workers.

The prior work experience of each worker may be represented by a value within a range (e.g., 1 to 5) that is selected by the worker indicating the level of prior work experience relevant to a particular subtask. The priority of task diversity and the priority of group importance may each be represented by a value which is selected by an administrator. For example, if task diversity is set to 1, the assignment engine may prioritize giving workers a variety of different subtasks instead of repeating the same subtasks, which may increase personal engagement and satisfaction, produce higher quality work, and prevent repetitive strain injuries. In contrast, if task diversity is set to 0, the assignment engine may prioritize giving workers the same or similar subtasks, which can help workers learn specific skills and become more efficient at certain subtasks. For example, if group importance is set to 1, the assignment engine may prioritize assigning multiple workers to a same subtask (section), which may increase team work and team building. In contrast, if group importance is set to 0, the assignment engine may prioritize assigning a single worker to each subtask (section), which prioritizes working independently for workers to stay more focused.

The assignment engine may determine the subtask assignments for the workers dynamically and continuously adapt to any changes in the group of workers or the progress of the subtasks to maintain efficient distribution of subtask assignments. For example, the assignment engine may re-determine the subtask assignments whenever a new worker joins the task, a previous worker leaves the task, and/or a subtask is completed. The assignment engine may also generate and display a dashboard user interface (UI) that displays a task overview and provides a visualization of the entire task completion process.

The assignment engine may determine a subtask assignment that is specific to each worker, and distribute the subtask assignment to the worker by transmitting the subtask assignment to the worker's user device. The user device for each worker receives and displays a subtask assignment that is personalized and tailored for the individual worker, for example, depending on the worker's prior work experience and/or subtasks the worker has already excelled. The subtask assignment received and displayed at each user device may include step-by-step instructions for completing the subtask, as well as images or video relating to the subtask. When a worker completes a subtask, the worker enters an input indicating that the assigned subtask is completed via the user device, which transmits a "subtask complete" message to the assignment server. After each subtask is completed, the assignment engine may re-determine and re-distribute subtask assignments to the group of workers. The assignment engine may continue to re-determine and re-distribute subtask assignments until each subtask of the task is completed.

The subtask assignment system may be implemented for assisting groups of human workers to complete any variety of physical assembly task more efficiently, such as in small-scale tasks (such as toy building, furniture assembly, circuit board assembly, etc.), or to large-scale tasks (such as architectural construction, disaster relief, large art installations, building a prefabricated house, etc.). The subtask assignment system may also be implemented for completing physical assembly tasks that vary in the range of tools, materials, and required skills.

At least one advantage of the disclosed techniques is that individual differences of human workers are accounted for when determining subtask assignments for a group of workers. For example, the disclosed technique may consider the prior work experience for each worker when determining the subtask assignments for the group of workers. Thus, the disclosed technique provides a technological improvement and technological advancement over prior approaches as the disclosed technique may generate improved and more precise subtask assignments that are specific and appropriate for each individual worker in comparison to prior techniques, which do not consider differences or variability between human workers. The disclosed technique provides a technological improvement and technological advancement over prior approaches as the disclosed technique may generate subtask assignments for a group of human workers that enable a task to be completed more efficiently and with higher quality than in previous techniques.

Another advantage of the disclosed technique is that it accounts for human-based parameters. For example, the disclosed technique may consider task diversity which prioritizes assigning workers a variety of subtasks and group importance which biases the technique towards assigning multiple workers to a same subtask. Thus, the disclosed technique provides a technological improvement and technological advancement over prior approaches as the disclosed technique may generate improved subtask assignments that increase personal engagement/interest, produce higher quality work, prevent repetitive strain, and/or emphasize team work and team building in comparison to conventional techniques that do not account for human-based considerations.

Aspects of the subject matter described herein are set out in the following numbered any of clauses.

1. In some embodiments, a computer-implemented method for determining and distributing subtask assignments for a task that is divisible into a plurality of subtasks, the method comprising: assigning, at an assignment server, a first subtask to a first worker included in a plurality of workers based, at least in part, on a first value indicating a prior work experience of the first worker, wherein the first worker is associated with a first user device; assigning, at the assignment server, a second subtask to a second worker included in the plurality of workers based, at least in part, on a second value indicating a prior work experience of the second worker, wherein the second worker is associated with a second user device, and the second value is different than the first value; and transmitting, via a network, the first subtask to the first user device and the second subtask to the second user device.

2. The computer-implemented method of clause 1, further comprising receiving a plurality of values, wherein each value indicates a prior work experience for a particular worker included in the plurality of workers for a particular subtask included in the plurality of subtasks.

3. The computer-implemented method of any of clauses 1-2, wherein the first subtask is assigned to the first worker further based, at least in part, on a task diversity parameter that indicates a priority associated with assigning workers different subtasks or a priority associated with assigning workers repetitive subtasks.

4. The computer-implemented method of any of clauses 1-3, wherein the first subtask is assigned to the first worker further based, at least in part, on a group importance parameter that indicates a priority associated with assigning multiple workers to a given subtask or a priority associated with assigning a single worker to a given subtask.

5. The computer-implemented method of any of clauses 1-4, further comprising generating a graphical user interface that displays a visualization of a completion process for the task.

6. The computer-implemented method of any of clauses 1-5, wherein transmitting the first subtask to the first user device comprises transmitting at least one of text instructions for the first subtask, an image illustrating the first subtask, and a description of one or more tools required to complete the first subtask.

7. The computer-implemented method of any of clauses 1-6, wherein transmitting the second subtask to the second user device comprises transmitting at least one of text instructions for the second subtask, an image illustrating the second subtask, and a description of one or more tools required to complete the second subtask.

8. The computer-implemented method of any of clauses 1-7, wherein the task pertains to physically assembling an article or object.

9. The computer-implemented method of any of clauses 1-8, further comprising: receiving a message from the first user device indicating the first subtask is completed; and in response to receiving the message, assigning a third subtask to the first worker and transmitting the third subtask to the first user device.

10. In some embodiments, a non-transitory computer-readable medium storing program instructions that, when executed by a processor, cause the processor to determine and distribute subtask assignments for a task that is divisible into a plurality of subtasks by performing the steps of: assigning, at an assignment server, a first subtask to a first worker included in a plurality of workers based, at least in part, on a first value indicating a prior work experience of the first worker, wherein the first worker is associated with a first user device; assigning, at the assignment server, a second subtask to a second worker included in the plurality of workers based, at least in part, on a second value indicating a prior work experience of the second worker, wherein the second worker is associated with a second user device, and the second value is different than the first value; and transmitting, via a network, the first subtask to the first user device and the second subtask to the second user device.

11. The non-transitory computer-readable medium of clause 10, further comprising receiving a plurality of values, wherein each value indicates a prior work experience for a particular worker included in the plurality of workers for a particular subtask included in the plurality of subtasks.

12. The non-transitory computer-readable medium of any of clauses 10-11, wherein the first subtask is assigned to the first worker further based, at least in part, on a task diversity parameter that indicates a priority associated with assigning workers different subtasks or a priority associated with assigning workers repetitive subtasks.

13. The non-transitory computer-readable medium of any of clauses 10-12, wherein the first subtask is assigned to the first worker further based, at least in part, on a group importance parameter that indicates a priority associated with assigning multiple workers to a given subtask or a priority associated with assigning a single worker to a given subtask.

14. The non-transitory computer-readable medium of any of clauses 10-13, further comprising generating a graphical user interface that displays a hierarchical task tree that visually represents the task, the task tree comprising a plurality of nodes, each node representing a subtask.

15. The non-transitory computer-readable medium of any of clauses 10-14, wherein the graphical user interface further displays information regarding each worker in the plurality of workers including an availability status and a current subtask that the worker is currently assigned.

16. The non-transitory computer-readable medium of any of clauses 10-15, wherein the task pertains to physically assembling an article or object.

17. The non-transitory computer-readable medium of any of clauses 10-16, further comprising: assigning, at the assignment server, the first subtask to a third worker included in a plurality of workers, wherein the third worker is associated with a third user device; and transmitting, via the network, the first subtask to the third user device.

18. In some embodiments, a system configured for communicating information related to computing device activity, comprising: an assignment server comprising: a memory that includes an assignment engine; and a processor that is coupled to the memory and, upon executing the assignment engine, performs the steps of: assigning a first subtask to a first worker included in a plurality of workers based, at least in part, on a first value indicating a prior work experience of the first worker, wherein the first worker is associated with a first user device; assigning a second subtask to a second worker included in the plurality of workers based, at least in part, on a second value indicating a prior work experience of the second worker, wherein the second worker is associated with a second user device, and the second value is different than the first value; and transmitting, via a network, the first subtask to the first user device and the second subtask to the second user device.

19. The system of clause 18, wherein transmitting the first subtask to the first user device comprises transmitting at least one of text instructions for the first subtask, an image illustrating the first subtask, and a description of one or more tools required to complete the first subtask.

20. The system of any of clauses 19-20, further comprising: a first user device comprising: a memory that includes a user engine; and a processor that is coupled to the memory and, upon executing the user engine, performs the steps of: receiving the first subtask; and displaying at least one of the text instructions for the first subtask, the image illustrating the first subtask, and the description of the one or more tools required to complete the first subtask.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. A computer-implemented method for determining and distributing subtask assignments for a task that is divisible into a plurality of subtasks, the method comprising:
    identifying a plurality of connections from a plurality of user devices to an assignment server;
    determining, at the assignment server, a plurality of workers that are available to perform the task based on the plurality of connections;
    generating, at the assignment server, a tree graph based on the task, wherein each node included in the tree graph corresponds to a different subtask included in the plurality of subtasks and indicates a relationship between the different subtask and each other subtask included in the plurality of subtasks;
    executing, at the assignment server, a subtask assignment algorithm to compute, for each worker included in the plurality of workers and for each subtask included in the plurality of subtasks, a priority value associated with the subtask based on a position of the subtask in the tree graph relative to each other subtask and one or more parameter values that indicate one or more characteristics of the worker, wherein the priority value indicates a priority of assigning the subtask to the worker;
    selecting, at the assignment server and via the executing subtask assignment algorithm, a first subtask from the plurality of subtasks to assign to a first worker included in the plurality of workers based, at least in part, on the set of priority values computed for the first worker, wherein the first worker is associated with a first user device included in the plurality of user devices;
    selecting, at the assignment server and via the executing subtask assignment algorithm, a second subtask from the plurality of subtasks to assign to a second worker included in the plurality of workers based, at least in part, on the set of priority values computed for the second worker, wherein the second worker is associated with a second user device included in the plurality of user devices, and the set of priority values computed for the second worker is different from the set of priority values computed for the first worker;
    assigning, at the assignment server, the first subtask to the first worker and the second subtask to the second worker;
    receiving, at the assignment server, a message from one or more sensors, the message indicating the first subtask is complete, wherein the one or more sensors are configured to automatically detect subtask completion and transmit the message to the assignment server in response to automatically detecting subtask completion;
    updating the tree graph based on the message received from the one or more sensors and assigning the second subtask to the second worker; and
    transmitting, based on the updated tree graph, a third subtask to the first user device via a first connection included in the plurality of connections, and the second subtask to the second user device via a second connection included in the plurality of connections.

2. The computer-implemented method of claim 1, further comprising receiving a plurality of values, wherein each value indicates a prior work experience for a particular worker included in the plurality of workers for a particular subtask included in the plurality of subtasks.

3. The computer-implemented method of claim 1, wherein computing the priority value is further based on a task diversity parameter that indicates a priority associated with assigning workers different subtasks or a priority associated with assigning workers repetitive subtasks.

4. The computer-implemented method of claim 1, wherein the computing the priority value is further based on a group importance parameter that indicates a priority associated with assigning multiple workers to a given subtask or a priority associated with assigning a single worker to a given subtask.

5. The computer-implemented method of claim 1, further comprising generating a graphical user interface that displays a visualization of a completion process for the task.

6. The computer-implemented method of claim 1, wherein transmitting the third subtask to the first user device comprises transmitting at least one of text instructions for the third subtask, an image illustrating the third subtask, and a description of one or more tools required to complete the third subtask.

7. The computer-implemented method of claim 1, wherein transmitting the second subtask to the second user device comprises transmitting at least one of text instructions for the second subtask, an image illustrating the second subtask, and a description of one or more tools required to complete the second subtask.

8. The computer-implemented method of claim 1, wherein the task pertains to physically assembling an article or object.

9. The computer-implemented method of claim 1, further comprising:
in response to receiving the message from the one or more sensors, assigning a third subtask to the first worker.

10. A non-transitory computer-readable medium storing program instructions that, when executed by a processor, cause the processor to determine and distribute subtask assignments for a task that is divisible into a plurality of subtasks by performing the steps of:
identifying a plurality of connections from a plurality of user devices to an assignment server;
determining, at the assignment server, a plurality of workers that are available to perform the task based on the plurality of connections;
generating, at the task assignment server, a tree graph based on the task, wherein each node included in the tree graph corresponds to a different subtask included in the plurality of subtasks and indicates a relationship between the different subtask and each other subtask included in the plurality of subtasks;
executing, at the assignment server, a subtask assignment algorithm to compute, for each worker included in the plurality of workers and for each subtask included in the plurality of subtasks, a priority value associated with the subtask based on a position of the subtask in the tree graph relative to each other subtask and one or more parameter values that indicate one or more characteristics of the worker, wherein the priority value indicates a priority of assigning the subtask to the worker;
selecting, at the assignment server and via the executing subtask assignment algorithm, a first subtask from the plurality of subtasks to assign to a first worker included in the plurality of workers based, at least in part, on the set of priority values computed for the first worker, wherein the first worker is associated with a first user device included in the plurality of user devices;
selecting, at the assignment server and via the executing subtask assignment algorithm, a second subtask from the plurality of subtasks to assign to a second worker included in the plurality of workers based, at least in part, on the set of priority values computed for the second worker, wherein the second worker is associated with a second user device included in the plurality of user devices, and the set of priority values computed for the second worker is different from the set of priority values computed for the first worker;
assigning, at the assignment server, the first subtask to the first worker and the second subtask to the second worker;
receiving, at the assignment server, a message from one or more sensors, the message indicating the first subtask is complete, wherein the one or more sensors are configured to automatically detect subtask completion and transmit the message to the assignment server in response to automatically detecting subtask completion;
updating the tree graph based on the message received from the one or more sensors and assigning the second subtask to the second worker; and
transmitting, based on the updated tree graph, a third subtask to the first user device via a first connection included in the plurality of connections, and the second subtask to the second user device via a second connection included in the plurality of connections.

11. The non-transitory computer-readable medium of claim 10, further comprising receiving a plurality of values, wherein each value indicates a prior work experience for a particular worker included in the plurality of workers for a particular subtask included in the plurality of subtasks.

12. The non-transitory computer-readable medium of claim 10, wherein computing the priority value is further based on a task diversity parameter that indicates a priority associated with assigning workers different subtasks or a priority associated with assigning workers repetitive subtasks.

13. The non-transitory computer-readable medium of claim 10, wherein computing the priority value is further based on a group importance parameter that indicates a priority associated with assigning multiple workers to a given subtask or a priority associated with assigning a single worker to a given subtask.

14. The non-transitory computer-readable medium of claim 10, further comprising generating a graphical user interface that displays a hierarchical task tree that visually represents the task, the task tree comprising a plurality of nodes, each node representing a subtask.

15. The non-transitory computer-readable medium of claim 14, wherein the graphical user interface further displays information regarding each worker in the plurality of workers including an availability status and a current subtask that the worker is currently assigned.

16. The non-transitory computer-readable medium of claim 10, wherein the task pertains to physically assembling an article or object.

17. The non-transitory computer-readable medium of claim 10, further comprising:
assigning, at the assignment server, the first subtask to a third worker included in the plurality of workers, wherein the third worker is associated with a third user device; and
transmitting, the first subtask to the third user device via a third connection included in the plurality of connections.

18. A system configured for communicating information related to computing device activity, comprising:
an assignment server comprising:
a memory that includes an assignment engine; and
a processor that is coupled to the memory and, upon executing the assignment engine, performs the steps of:

identifying a plurality of connections from a plurality of user devices to the assignment server;

determining a plurality of workers that are available to perform a task based on the plurality of connections;

generating a tree graph based on the task, wherein each node included in the tree graph corresponds to a different subtask included in the plurality of subtasks and indicates a relationship between the different subtask and each other subtask included in the plurality of subtasks;

executing a subtask assignment algorithm to compute, for each worker included in the plurality of workers and for each subtask included in the plurality of subtasks, a priority value associated with the subtask based on a position of the subtask in the tree graph relative to each other subtask and one or more parameter values that indicate one or more characteristics of the worker, wherein the priority value indicates a priority of assigning the subtask to the worker;

selecting, via the executing subtask assignment algorithm, a first subtask from the plurality of subtasks to assign to a first worker included in the plurality of workers based, at least in part, on the set of priority values computed for the first worker, wherein the first worker is associated with a first user device included in the plurality of user devices;

selecting, via the executing subtask assignment algorithm, a second subtask from the plurality of subtasks to assign to a second worker included in the plurality of workers based, at least in part, on the set of priority values computed for the second worker, wherein the second worker is associated with a second user device included in the plurality of user devices, and the set of priority values computed for the second worker is different from the set of priority values computed for the first worker;

assigning the first subtask to the first worker and the second subtask to the second worker;

receiving, at the assignment server, a message from one or more sensors, the message indicating the first subtask is complete, wherein the one or more sensors are configured to automatically detect subtask completion and transmit the message to the assignment server in response to automatically detecting subtask completion;

updating the tree graph based on the message received from the one or more sensors and assigning the second subtask to the second worker; and transmitting, based on the updated tree graph, a third subtask to the first user device via a first connection included in the plurality of connections, and the second subtask to the second user device via a second connection included in the plurality of connections.

19. The system of claim 18, wherein transmitting the third subtask to the first user device comprises transmitting at least one of text instructions for the third subtask, an image illustrating the third subtask, and a description of one or more tools required to complete the third subtask.

20. The system of claim 19, further comprising:
 a first user device comprising:
  a memory that includes a user engine; and
  a processor that is coupled to the memory and, upon executing the user engine, performs the steps of:
   receiving the first subtask; and
   displaying at least one of the text instructions for the first subtask, the image illustrating the first subtask, and the description of the one or more tools required to complete the first subtask.

\* \* \* \* \*